(12) United States Patent
Nishimura

(10) Patent No.: US 6,512,109 B1
(45) Date of Patent: Jan. 28, 2003

(54) PROCESSES FOR PRODUCING SACCHARIDE DERIVATIVES USING SOLID ULTRASTRONG ACID

(75) Inventor: Shin-Ichiro Nishimura, 1-1-302, Kita 9-jo Nishi 16-chome, Chuo-ku, Sapporo-shi, Hokkaido (JP)

(73) Assignees: Hokkaido Electric Power Company, Incorporated, Hokkaido (JP); Shin-Ichiro Nishimura, Hokkaido (JP)

( * ) Notice: Subject to any disclaimer, the term of this patent is extended or adjusted under 35 U.S.C. 154(b) by 0 days.

(21) Appl. No.: 09/744,803

(22) PCT Filed: Aug. 6, 1999

(86) PCT No.: PCT/JP99/04261
§ 371 (c)(1), (2), (4) Date: Jan. 30, 2001

(87) PCT Pub. No.: WO00/09565
PCT Pub. Date: Feb. 24, 2000

(30) Foreign Application Priority Data

Aug. 10, 1998 (JP) .............................. 98/225895

(51) Int. Cl.$^7$ .......................... C07H 15/04; C07H 1/00; C08B 37/00
(52) U.S. Cl. .................. 536/123.1; 536/18.7; 536/55.1; 536/55.3; 536/120; 536/123; 536/123.13; 536/124; 536/126
(58) Field of Search .............................. 536/18.7, 55.1, 536/55.3, 120, 123, 123.1, 123.13, 124, 126

(56) References Cited

FOREIGN PATENT DOCUMENTS

| JP | 57-180605 | 11/1982 |
| JP | 4-331201 | 11/1992 |
| JP | 8-73586 | 3/1996 |

OTHER PUBLICATIONS

K. Toshima et al., "Recent Progress in O–Glycosylation Methods and Its Application to Natural Products Synthesis", Chemical Reviews, vol. 93, No. 4, pp. 1503–1531, 1993.

C. Schuerch, "Synthesis and Polymerization of Anhydro Sugars", Advances in Carbohydrate Chemistry and Biochemistry, vol. 39, pp. 157–212, 1981.

N. K. Kochetkov, "Synthesis of Polysaccharides with a Regular Structure", Tetrahedron, vol. 43, No. 11, pp. 2389–2436, 1987.

S. Kobayashi et al., "Enzymatic Polymerization and Oligomerization", Advances in Polymer Science, vol. 121, pp. 1–30, 1985.

G. Ponder et al., "Polysaccharides from Thermal Polymerization of Glucosides", Carbohydrate Research, 208, pp. 93–104, 1990.

K. Arata et al., "Reactions of Butane and Isobutane Catalyzed by Zirconium Oxide Treated with Sulfate Ion. Solid Superacid Catalyst$^1$", Journal of the American Chemical Society, 101, pp. 6439–6441, 1979.

Kazushi Nitta and Makoto Hino, "Hyomen (Surface)", vol. 19, No. 2, pp. 75–82, 1981.

*Primary Examiner*—Peter O'Sullivan
(74) *Attorney, Agent, or Firm*—Wenderoth, Lind & Ponack, L.L.P.

(57) ABSTRACT

This invention provides glycoside polymers or glycosides which are useful as a material for functional foods, biodegradable fibers or medicaments, said glycoside polymers being produced efficiently by subjecting a compound of the formula (1):

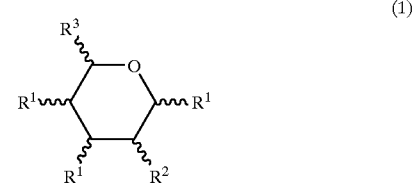

(1)

wherein $R^1$ is —OH, $R^2$ is —OH or —NHCOCH$_3$, $R^3$ is —CH$_2$OH, —COOH or —CH$_3$, to a melt polymerization or a solution polymerization in the presence of a solid superacid, and said glycosides being produced by reacting the compound (1) with a saturated or unsaturated alcohol in the presence of a solid superacid.

9 Claims, No Drawings

PROCESSES FOR PRODUCING SACCHARIDE DERIVATIVES USING SOLID ULTRASTRONG ACID

This application is a 371 of PCT/JP99/04261 filed Aug. 6, 1999.

TECHNICAL FIELD

This invention relates to a method for producing glycoside polymers or glycosides which are useful as materials for functional foods, biodegradable fibers, medicaments, and the like. More particularly, it relates to a method for producing glycoside polymers such as high molecular weight polysaccharides, polysaccharide-like polyesters or glycosides from natural resources such as glucose by using a solid superacid catalyst.

BACKGROUND ART

Synthetic fibers originated from petroleum such as polyamides (e.g. nylon) or polyesters are produced from petroleum originated in fossil, but such materials are limited resources and hence will be exhausted in future. By the way, some glycosides have an amino group (an alkaline functional group) and/or a carboxyl group (an acidic functional group) which are a functional group characteristic in such petroleum materials and hence may be useful as a material for producing fibers. However, it has never been succeeded to derive these glycosides into commercially usable fibers, except cellulose which is a polyacetal.

On the other hand, glycosides are extracted from sugarcare, coconut palm, prawn, crabs, sea tangle, woods, and the like, and hence those are unlimited resources and will be not exhausted forever. Besides, enzyme being capable decomposing glycosides are distributed widely in various organisms such as microorganisms, mammalia, etc., and hence, synthetic fibers produced by using these glycosides will probably be biodegradable. Accordingly, it will be much required to develop a method for producing synthetic fibers by using glycosides as the starting material.

The known methods for producing these synthetic fibers and starting materials therefor such as glycoside polymers or glycosides will roughly be classified into three methods, that is, a stepwise glycosylation method, a liquid polymerization method, and a bulk polymerization method.

As the stepwise glycosylation method, there has been used various Keonigs-Knorr's glycosylation reactions for a long time (Chem.Rev.,93,1503(1993)) The stepwise glycosylation method comprises extending the chain of the glycoside molecules one-by-one. In this method, since glycosides are a polyfunctional molecule and have many hydroxy groups in the molecule, it is necessary to protect the most hydroxy groups other than the hydroxy group to be formed into glycoside bond, and only said hydroxy group to be reacted shall be remained without being protected in the reaction.

As the solution polymerization method, various methods are know, for example, a ring opening polymerization of anhydrous saccharides by Schuerch et al. (Adv. Carbohydr. Chem. Biochem., 39, 157 (1981)), a cyanoethylidene method by Kochetkov et al. (Tetrahedron, 43, 2389 (1987)), a method utilizing a reverse glycohydrolase by Kobayashi et al. (Adv. Polym. Sci., 121, 1 (1995)).

The ring opening polymerization can give high molecular weight stereoregular polysaccharides. However, since this method is an ion polymerization, the reaction shall be carried out under high vacuum condition. Besides, this method has to use a solvent such as dichloromethane which is harmful in view of environmental disruption.

The cyanoethylidene method can produce stereoregular polysaccharides having complicated structure, but it is problem in side-production of cyanides during the polymerization reaction, which are extremely toxic cyanic acid derivatives, such as potassium cyanide. Accordingly, this method is very dangerous.

Next, the method using an enzyme has been succeeded for production of cellulose, but it is difficult to obtain a high molecular weight product in high yield. Moreover, the enzyme to be used has a substrate specificity and hence, usable glycosides are very limited. So, this method is not generally available.

The final method, bulk polymerization method can form a glycoside bond by carrying the reaction without using solvent, wherein the glycosides are molten with heating and an acetal exchange reaction proceeds to form the glycoside bond. The bulk polymerization method of glucose, etc. by Richards et al. comprises melting a glycoside having unprotected hydroxy groups by heating at a high temperature and then subjecting to the polymerization in the presence of dichloroacetic acid catalyst (Carbohydr. Res., 208, 93 (1990)). However, this method still has a defect such as coloring of the product, and due to the side reaction, the product has less purity. Moreover, the catalyst used therein dissolves in the reaction system or in various solvents, and hence, it is difficult to remove the catalyst from the reaction mixture.

DISCLOSURE OF INVENTION

An object of the present invention is to prove an improved method for producing materials advantageous in view of keeping environment in good conditions, for example, materials useful for producing functional foods, biodegradable fibers, etc. by using glycosides which are unlimited resources in simple procedure and safety. Another object of the invention is to provide a method for producing polymers or glycosides by using glycosides having unprotected saccharide chains without a solvent or in an aqueous solvent in a simple step contrary to the conventional methods which require very complicated steps, and further, the catalyst used in the method is recycled.

The present inventors have found that when a glycoside is subjected to a melt polymerization or solution polymerization by using as a catalyst a specific solid superacid, the desired glycoside polymers can be produced in an extremely high yield, and further that when a glycoside is reacted with an alcohol in the presence of the solid superacid, the desired glycosides can easily be produced, and then the present invention has been accomplished.

BEST MODE FOR CARRYING OUT THE INVENTION

The present invention relates to a method for producing glycoside polymers by subjecting a compound of the formula (1):

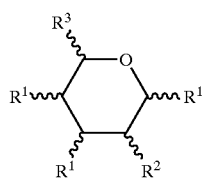

(1)

wherein $R^1$ is —OH, $R^2$ is —OH or —NHCOCH$_3$, $R^3$ is —CH$_2$OH, —COOH or —CH$_3$, to a melt polymerization or solution polymerization in the presence of a solid superacid.

The starting compound of the formula (1) includes, for example, monosaccharides such as D-glucose, D-galactose, D-mannose (in the above formula (1), $R^1$: —OH, $R^2$: —OH, $R^3$: —CH$_2$OH), L-fucose (in the above formula (1), $R^1$: —OH, $R^2$: —OH, $R^3$: —CH$_3$), and the like, aldonic acids such as D-glucuronic acid, D-galacturonic acid (in the above formula (1), $R^1$: —OH, $R^2$: —OH, $R^3$: —COOH), amino-sugars such as N-acetyl-D-glucosamine, N-acetyl-D-galactosamine (in the above formula (1), $R^1$: —OH, $R^2$: NHCOCH$_3$, $R^3$: —CH$_2$OH).

The solid superacids to be used as a catalyst include any conventional compounds which have hitherto been used as a catalyst in isomerization of alkyl group, or introduction of a keto group into aromatic hydrocarbons, for example, the following compounds:

$SO_{44}/ZrO_2$, $SO_4/SnO_2$, $SO_4/HfO_2$, $SO_4/TiO_2$, $SO_4/Al_2O_3$, $SO_4/Fe_2O_3$, $SO_4/SiO_2$, $WO_3/ZrO_2$, $MoO_3/ZrO_2$, $WO_3/SnO_2$, $WO_3/TiO_2$, $WO_3/Fe_2O_3$, and $B_2O_3/ZrO_2$ (cf K. Arata et al. J. Am. Chem. Soc., 101, 6439 (1979)) One or more of the above compounds are used. The amount thereof is not specified and is an amount effective for catalyzing the polymerization reaction, but it is usually in the range of 0.1 to 10 equivalent, preferably 1.0 equivalent to the starting compound (1).

Any commercially available solid superacids may be used as they stand, but those commercial products are sometimes wetted with atmospheric moisture, and hence, it is preferable to calcine the material by super-heating. For instance, the commercially available zirconia sulfate ($SO_4/ZrO_2$) is usually calcined at about 650° C. for about 2 hours.

The melt polymerization and the solution polymerization can be carried out by conventional methods.

More particularly, it is carried out as follows.

When the compounds of the formula (1) have a melting point, for example, in case of D-glucose or D-glucuronic acid, they are subjected to a melt polymerization in the following manner to give the desired glycoside polymers.

A saccharide of the formula (1) is added to a chinal pot and thereto is added an equivalent amount of an activated solid superacid (e.g. zirconia sulfate) and is mixed. The mixture is reacted in an electric furnace without solvent at a temperature of a melting point of the compound (1) for 24 hours. After finishing the reaction, the reaction mixture is dissolved in a deionized water, the catalyst is removed by filtration with a filter paper or by centrifugation, and the filtrate is concentrated. The residue is purified by gel filtration with Sephadex-G25, and the filtrate is concentrated and then lyophilized to dry the product completely.

When the compounds of the formula (1) have no melting point, for example, N-acetyl-D-glucosamine, the product is prepared in the following manner.

A saccharide of the formula (1) having no melting point is added to a flask and thereto is added as a solvent a deionized water. To the mixture is added an equivalent amount of an activated solid superacid (e.g. zirconia sulfate) and the mixture is reacted with stirring at 100° C. for 24 hours. The reaction mixture is dissolved in a deionized water, the catalyst is removed by filtration with a filter paper or by centrifugation, and the filtrate is concentrated. The residue is purified by gel filtration with Sephadex-G25, and the filtrate is concentrated and then lyophilized to dry the product safely.

When the starting compounds of the formula (1) is a monosaccharide or an amino sugar (in the formula (1), $R^3$ is —CH$_2$OH), the glycoside polymer produced by the present invention is a lycopolymer of the formula (2):

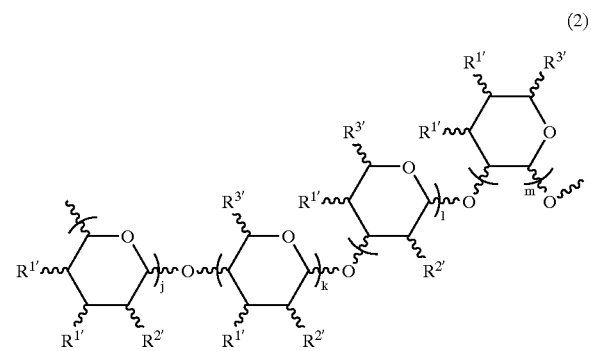

(2)

wherein $R^{1'}$ is —OH, $R^{2'}$ is —OH or —NHCOCH$_3$, and $R^{3'}$ is —CH$_2$OH, or any one or more of $R^{1'}$, $R^{2'}$ and $R^{3'}$ is a residue of saccharide molecule of the formula (1), and j, k, l, and m means an absolute number of binding form of the saccharide molecules within the parentheses in the above formula, and j, k, l, m≧0, provided that the total number of j, k, l, and m is in the range of 2 to 30. The binding form in the parentheses in the above formula means that the binding form in the parenthesis "j" is (1→6)-α and -β bond, and the binding form in the parenthesis "k" is (1→4)-α and -β bond, the binding form in the parenthesis "l" is (1→3)-α and -α bond, and the binding form in the parenthesis "m" is (1→2)-α and -β bond.

The starting compound of the formula (1) is fucose (in the formula (1), $R^3$ is —CH$_3$), the glycoside polymer obtained by the process is a glycopolymer of the above formula (2) wherein $R^{3'}$ is —CH$_3$, j=0, and other symbols $R^1$, $R^2$, k, l, and m are as defined above.

Further, when the starting compound of the formula (1) is an aldonic acid (in the formula (1), $R^2$ is —OH, $R^3$ is —COOH), the glycoside polymer produced by the present polymerization is a compound of the formula (3):

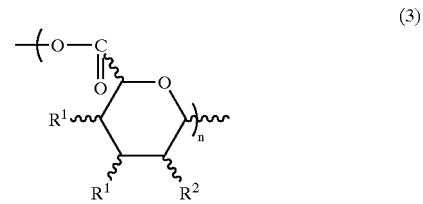

(3)

wherein $R^1$ is —OH, $R^2$ is —OH, n is an integer of 2 to 30.

The present invention is further to provide a method for producing an amphiphilic compound of the formula (5):

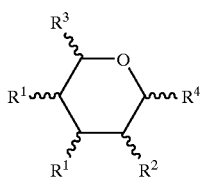

(5)

wherein $R^1$ is —OH, $R^2$ is —OH, $R^4$ is as defined below, and $R^3$ is —CH$_2$OH or —CH$_3$, which comprises reacting a monosaccharide of the formula (1) wherein $R^1$ is —OH, $R^2$ is —OH, $R^3$ is —CH$_2$OH or —CH$_3$ (e.g. D-glucose, D-galactose, D-mannose, L-fucose, etc.) with a saturated or unsaturated alcohol of the formula (4):

$$R^4\text{—OH} \qquad (4)$$

wherein $R^4$ is an alkyl chain of the formula: —(CH$_2$)$_p$—CH$_3$ (0≦p≦23) or a corresponding unsaturated group having 1 to 2 unsaturated bonds, in the presence of a solid superacid as mentioned above.

The production of the formula (5) is specifically carried out in the following manner.

A monosaccharide of the formula (1) is entered in a flask and thereto is added an excess amount of a saturated or unsaturated alcohol of the formula (4) in the form of a solution. To the mixture is added an equiamount of an activated solid superacid (e.g. zirconia sulfate), and the mixture is stirred at 60–120° C. for 24 hours. After the reaction is completed, the catalyst is removed by filtration with a filter paper using methanol or by centrifugation, the filtrate is concentrated. The concentrated mixture is passed through a silica gel column (chloroform) to remove unreacted alcohol (4), and then developed with a mixture of chloroform and methanol to purify and recover the desired compound (5).

The solid superacid used in the present method is recovered after the reaction, regenerated and is used repeatedly, which is economical.

The regeneration of the solid superacid is carried out as follows. The solid superacid is recovered from the filter or centrifuging tube after the desired product is separated from the reaction mixture, thereto is added 0.5 to 1N sulfuric acid and the mixture is suspended. After removing supernatant, to the remaining mixture is added a deionized water. The procedures of recovering, suspending and removing of the supernatant are repeated 2 to 3 times, and thereafter, the recovered product is calcined in an electric furnace at about 650° C.

The present invention is illustrated in the following Examples and Reference Examples, but should not be construed to be limited thereto.

REFERENCE EXAMPLE 1

Preparation of Zirconia Sulfate (SO$_4$/ZrO$_2$)

A commercially available zirconia sulfate is calcined in an electric furnace by a method of Arata et al. (K. Arata et al., J. Am. Chem. Soc., 101, 6439 (1979)).

REFERENCE EXAMPLE 2

It is prepared by a method of Arata et al. (Kazushi Arata, Makoto Hino, "Hyomen (Surface)", 1981, No. 2, 75–82). Iron sulfate is treated with aqueous ammonia to give iron hydroxide. It is dried and meshed to take products having a size of 100 mesh or less and dipped in 0.5N sulfuric acid, and then the solid material is separated by filtration. The solid material thus obtained is calcined at 500° C. to give the desired sulfated iron oxide.

EXAMPLE 1

Polymerization of D-glucose

D-Glucose (200mg, 1.110mmol) is entered in a chinal pot and thereto is added zirconia sulfate obtained in the above Reference Example 1 (243.4mg, 1.10 mmol), and the mixture is mixed well. The mixture is reacted in an electric furnace without solvent at a temperature of a melting point of D-glucose, i.e. at 153° C. for 24 hours.

After the reaction is completed, the reaction mixture is dissolved in a deionized water, and the catalyst is removed by filtration with a filter paper or by centrifugation, and the filtrate is concentrated. The residue is purified by gel filtration with Sephadex-G25, concentrated, and then lyophilized to dry completely to give the desired glucose polymer (a mixture of the compounds of the formula (2), wherein $R^{2'}$ is —OH, and $R^{1'}$, $R^{3'}$, j, k, l, and m are as defined above) (168.7mg, 84%).

Number average molecular weight: 1400.

$^{13}$C-NMR ppm: 96.863 (C$_1$-α), 93.037 (C$_1$-β), 76.884, 76.724 (C$_3$-α, C$_5$-α), 75.117 (C$_2$-α), 73.735 (C$_3$-β), 72.447, 72.404 (C$_2$-β, C$_5$-β), 70.651 (C$_4$-α), 70.593 (C$_4$-β), 61.763 (C$_6$-α), 61.625 (C$_6$-β)

EXAMPLE 2

Polymerization of D-glucuronic Acid

D-Glucuronic acid (350 mg, 0.773 mmol) is entered in a chinal pot and thereto is added zirconia sulfate obtained in Reference Example 1 (169.4 mg, 0.773 mmol), and the mixture is mixed well. The mixture is reacted in an electric furnace without solvent at a temperature of a melting point of D-glucuronic acid, i.e. at 160° C. for 24 hours.

After the reaction is completed, the reaction mixture is dissolved in a deionized water, and the catalyst is removed by filtration with a filter paper or by centrifugation, and the filtrate is concentrated. The residue is purified by gel filtration with Sephadex-G25, concentrated, and then lyophilized to dry completely to give the desired D-glucuronic acid polymer (a mixture of the compounds of the formula (3) (30.5 mg, 20.3%).

Number average molecular weight: 1200.

IR: 1780.0, 1145.6cm$^{-1}$(—COO—)

EXAMPLE 3

Polymerization of N-acetyl-D-glucosamine

N-Acetyl-D-glucosamine (150 mg, 0.678 mmol) is entered in a 100 ml flask, and thereto is added a deionized water (5 ml) to dissolve it. To the solution is added zirconia sulfate obtained in Reference Example 1 (148.7 mg, 0.678 mmol), and the mixture is reacted with stirring in an oil bath at 100° C. for 24 hours.

After the reaction is completed, the reaction mixture is filtered with a filter paper or centrifuged to remove the catalyst, and the filtrate is concentrated. The residue is purified by gel filtration with Sephadex-G25, concentrated, and then lyophilized to dry completely to give the desired polymer (a mixture of the compounds of the formula (2), wherein $R^{2'}$ is —NHCOCH$_3$, m=0 and $R^{1'}$, $R^{3'}$, j, k, l, and m are as defined above) (115.8 mg, 77.2%).

Number average molecular weight: 1600.

$^{13}$C-NMR ppm: 175.439 (—NH—CO—), 95.852 ($C_1$-α), 91.779 ($C_1$-β), 22.904 (—$CH_3$)

EXAMPLE 4

Polymerization of D-glucose

D-Glucose (200 mg, 1.110 mmol) is entered in a chinal pot and thereto is added sulfated iron oxide obtained in Reference Example 2 (200 mg), and the mixture is mixed well. The mixture is reacted in an electric furnace without solvent at a temperature of a melting point of D-glucose, i.e. at 153° C. for 24 hours.

After the reaction is completed, the reaction mixture is dissolved in a deionized water, and the catalyst is removed by filtration with a filter paper or by centrifugation, and the filtrate is concentrated. The residue is purified by gel filtration with Sephadex-G25 to give the desired polymer (a mixture of the compounds of the formula (2), wherein $R^{2'}$ is —OH, and $R^{1'}$, $R^{3'}$, j, k, l, and m are as defined above) (77%).

Number average molecular weight: 1800.

EXAMPLE 5

Synthesis of N-octyl α-D-glucopyranoside

D-Glucose (200 mg, 1.110 mmol) and n-octyl alcohol (5.2 ml, 33.3 mmol) are added to a 100 ml flask. To the mixture is added zirconia sulfate obtained in Reference Example 1 (243.4 mg, 1.110 mmol), and the mixture is reacted in an oil bath with stirring at 80° C. for 24 hours.

After the reaction is completed, the reaction mixture is filtered with a filter paper with methanol or centrifuged to remove the catalyst, and the filtrate is concentrated. The mixture is passed through a silica gel column (chloroform) to remove n-octyl alcohol and then developed with a mixture of chloroform and methanol (10:1) to purify and recover the product, and the eluted mixture is concentrated to give the title compound (120 mg, 41%).

EXAMPLE 6

Synthesis of N-hexyl-D-glucopyranoside

In n-hexanol (2.9 ml, 33.3 mmol) are suspended D-glucose (200 mg, 1.11 mmol) and zirconia sulfate obtained in Reference Example 1 (243 mg) and the mixture is reacted with stirring at 80° C. for 24 hours. After the reaction is completed, the reaction mixture is filtered, and the filtrate is concentrated. The resultant is treated with a silica gel column to remove n-hexanol by using chloroform as a developing solvent, and then the desired n-hexyl-D-glucopyranoside is eluted with a developing solvent of chloroform: methanol (10:1). Yield: 52%.

EXAMPLE 7

Synthesis of D-octyl-D-galactopyranoside

In n-octyl alcohol (5.2 ml, 33.3 mmol) are suspended D-galactose (200 mg, 1.11 mmol) and zirconia sulfate obtained in Reference Example 1 (243 mg) and the mixture is reacted with stirring at 80° C. for 24 hours. After the reaction is completed, the reaction mixture is filtered, and the filtrate is concentrated. The resultant is treated with a silica gel column to remove n-octyl alcohol by using chloroform as a developing solvent, and then the desired n-octyl-D-galactopyranoside is eluted with a developing solvent of chloroform : methanol (10:1). Yield: 48%.

REFERENCE EXAMPLE 3

Recovery and Regeneration of Catalyst

The catalyst is recovered from the filter paper and a centrifugal tube used in the above Examples, and thereto is added 0.5-1N sulfuric acid and the mixture is suspended. After removing the supernatant, a deionized water is added to the mixture. The above procedure is repeated two to three times, and then the resulting mixture is calcined in an electric furnace at 650° C. to regenerate the product.

EXPERIMENT 1

Experiment of Digestion with an Enzyme

The product of Example 1 was hydrolyzed with various kinds of glycohydrolase by varying the amount of enzyme and the reaction period of time, and then the molecular weight of the resulting products was measured.

(i) Digestion Test-1 with α-Amylase

The product of Example 1 (3 mg) was dissolved in a phosphate buffer (pH 6.9, 1.8 ml). The solution was warmed to 25° C. and thereto was added α-amylase which was prepared in three kinds of concentration (1U, 10U, 100U), and the mixture was reacted for 24 hours. The reaction was stopped by boiling the mixture to deactivate the enzyme. The reaction mixture was filtered, and the filtrate was subjected to a gel penetration chromatography (hereinafter, abbreviated as "GPC") using Shodex Asahipak GL 510-7E, by which the molecular weight of the products obtained by the digestion with enzyme was analyzed using pullulan as a standard substance. The results are shown below.

| Amount of enzyme (U) | Number average mol. wt. |
| --- | --- |
| 0 | 2800 |
| 1 | 2500 |
| 10 | 2200 |
| 100 | 1600 |

As is clear from the above results, the products had smaller molecular weight with increase of the amount of enzyme, but it was not completely hydrolyzed to the monomer (glucose, mol.wt.: 180).

(ii) Digestion Test-2 with α-Amylase

The product of Example 1 (3 mg) was dissolved in a phosphate buffer (pH 6.9, 750 μl). The solution was warmed to 25° C. and thereto was added a solution of α-amylase (1.4 mU) in the same buffer as above (46.4 μl), and the mixture was reacted, by which the change of molecular weight of the reaction products was checked with lapse of time.

The reaction was stopped at each reaction time shown below by boiling the mixture to deactivate the enzyme. The reaction mixture was filtered, and the molecular weight of the products obtained by the digestion with enzyme was analyzed using pullulan as a standard substance by means of GPC using Shodex Asahipak GL 510-7E. The results are shown below.

| Reaction time (min.) | Number average mol. wt. |
| --- | --- |
| 0 | 3500 |
| 30 | 3300 |
| 60 | 3200 |
| 180 | 3100 |
| 300 | 3000 |
| 600 | 3000 |
| 1440 | 3000 |

As is clear from the above results, the products had smaller molecular weight with the lapse of reaction time, but it was not completely hydrolyzed to the monomer (glucose, mol.wt.: 180).

(iii) Digestion Test with Pullulanase

The product of Example 1 (3 mg) was dissolved in a citrate-phosphate buffer (pH 5.0, 780 μl) and the mixture was warmed to 25° C., and thereto was added a solution of pullulanase (25 mU) in the same buffer as above (18.3 μl), and the mixture was reacted. The change of the molecular weight of the reaction product was checked with lapse of time.

The reaction was stopped at each reaction time shown below by boiling the mixture to deactivate the enzyme. The reaction mixture was filtered, and the molecular weight of the products obtained by the digestion with enzyme was analyzed using pullulan as a standard substance by means of GPC using Shodex Asahipak GL 510-7E. The results are shown below.

| Reaction time (min.) | Number average mol. wt. |
| --- | --- |
| 0 | 2400 |
| 10 | 2400 |
| 30 | 2300 |
| 60 | 2300 |
| 180 | 2300 |
| 300 | 2300 |
| 600 | 2400 |

As is clear from the above results, the change of the molecular weight of the products with the lapse of time was within the range of an error in GPC analysis, and hence, the product could not be hydrolyzed by pullulanase.

(iv) Digestion Test by Cellulase

The product of Example 1 (3 mg) was dissolved in an acetate buffer (pH 5.0, 700 μl) and the mixture was warmed to 25° C., and thereto was added a solution of cellulase (18 U and 36 U) in the same buffer as above (100 μl), and the mixture was reacted. The change of the molecular weight of the reaction product was checked with lapse of time.

The reaction was stopped at each reaction time shown below by boiling the mixture to deactivate the enzyme. The reaction mixture was filtered, and the molecular weight of the products obtained by the digestion with enzyme was analyzed using pullulan as a standard substance by means of GPC using Shodex Asahipak GL 510-7E. The results are shown below.

In case of cellulase (18 U):

| Reaction time (min.) | Number average mol. wt. |
| --- | --- |
| 0 | 2800 |
| 60 | 2900 |
| 1440 | 2800 |

In case of cellulase (36 U):

| Reaction time (min.) | Number average mol. wt. |
| --- | --- |
| 0 | 2800 |
| 60 | 2900 |
| 1440 | 2800 |

As is clear from the above results, the change of the molecular weight of the products with the lapse of time was within the range of an error in GPC analysis, and hence, the product could not be hydrolyzed by cellulase.

As is shown in the above experiments, the saccharide polymers of the present invention are not hydrolyzed by such an enzyme as cellulase or pullulanase, but is partially hydrolyzed by an enzyme being capable of hydrolyzing starch: α-amylaze. Thus, the polymers are partially hydrolyzed within a biobody, but are not completely hydrolyzed, and hence, it is suggested that they are not metabolized. Accordingly, the saccharide polymers of the present invention are not completely metabolized within the biobody contrary to starch but are only partial ly hydrolyzed, which means that the polymers are not nutrient source and can be used as an off-calorie diet food.

EXPERIMENT 2

Experiment of Effect on Human Immune Cells

The polysaccharide obtained in Example 1 was fractionated with Sephadex-G25 into a high molecular weight fraction (number average molecular weight: 1,500; hereinafter referred to "PSH" (abbreviation of Poly-Saccharide High Molecular Weight) and a low molecular weight fraction (number average molecular weight: 1,200; hereinafter referred to as "PSL" (abbreviation of Poly-Saccharide Low Molecular Weight), which were used in the following experiments.

(i) Growth of Immune Cells

Mouse spleen cells (including various immune cells such as T cells, B cells, macrophage, NK cells) were cultivated in the presence of PSH or PSL in various concentrations (0, 2.5, 5, 10 and 20 μ g/ml) for 5 days. Thereto was added $^3$H-thymidine and the mixture was incubated for 4 days. The amount of $^3$H-thymidine absorbed by the cells was measured by counting the radiation dose of the cells. When the cells grew due to the test compound, thymidine would be taken in the cells for the purpose of synthesis of DNA during the growth.

As a control, the cells were treated likewise in the co-presence of IL-2 (20 U/ml) which is an activator of T-cells being one of the immune cells.

As a result, both of PSH and PSL did not promote the growth of mouse spleen cells in comparison with the control where the cells were cultivated in the co-existence of IL-2.

(ii) Activation of Immune Cells

The activation effect of immune cells were tested by the presence or absence of an antigen CD69 which is specifically expressed by activated immune cells.

Mouse spleen cells were cultivated in the presence of PSH or PSL in various concentrations (0, 2.5, 5, 10 and 20 μg/ml) for 5 days. The culture broth was stained with commercially available antibody reagents specific to each immune cells (PE-complex anti-mouse CD4 monoclonal antibody: 0.065B, PE-complex anti-mouse CD8a monoclonal antibody: 01045B, PE-complex anti-mouse CD45R/B220 monoclonal antibody: 01125A, PE-complex anti-mouse Mac-1l(CD11b) monoclonal antibody: 01715B, and PE-complex anti-mouse NK1.1 monoclonal antibody: 01295B, all being manufactured by PharMingen Co.), by which the contained various immune cells such as T-cells, B-cells, macrophage, NK cells were distinguished. Further, various immune cells were stained by commercially available antibody reagents specific to CD69 (FITC-complex anti-mouse CD69 monoclonal antibody: 01504D, manufactured by PharMingen Co.), by which it was checked whether the immune cells were activated or not. The staining was observed by flow cytometry. As a control, the above procedure was repeated in the presence of IL-2 (an immune-activating protein).

As a result, both of PSH and PSL did not shown any effect for promoting the expression of CD69 in the immune cells.

As is clear from the above experiments, the saccharide polymer of the present invention do not give any affect on immune cells, and hence, even when they are taken as a food and then absorbed within biobody, they are not recognized as a foreign substance by the immune system in the biobody. Accordingly, the product can be taken as a safe food without any problem of side-effects such as allergy, inflammation, or fever.

INDUSTRIAL APPLICABILITY

According to the method of the present invention, the desired glycoside polymers and glycosides can be produced efficiently by a simple procedure, and further, the glycoside polymers and glycosides are extremely well soluble in water, and are suitable as a material for functional foods, biodegradable fibers, or various medicaments. Moreover, the solid superacids used as a catalyst in the reaction can be recovered, regenerated and used repeatedly, and hence, the method of the present invention is also advantageous from the economical viewpoint.

What is claimed is:

1. A method for producing saccharide polymers, which comprises subjecting a compound of the formula (1):

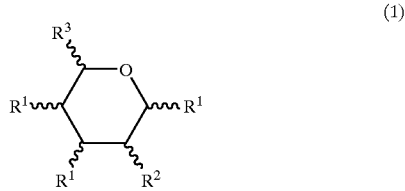

(1)

wherein $R^1$ is —OH, $R^2$ is —OH or —NHCOCH$_3$, $R^3$ is —CH$_2$OH, —COOH or —CH$_3$, to a melt polymerization or a solution polymerization in the presence of a solid superacid.

2. The method according to claim 1, wherein the solid superacid is one or more of the compounds selected from the group consisting of $SO_4/ZrO_2$, $SO_4/SnO_2$, $SO_4/HfO_2$, $SO_4/TiO_2$, $SO_4/Al_2O_3$, $SO_4/Fe_2O_3$, $SO_4/SiO_2$, $WO_3/ZrO_2$, $MoO_3/ZrO_2$, $WO_3/SnO_2$, $WO_3/TiO_2$, $WO_3/Fe_2O_3$ and $B_2O_3/ZrO_2$.

3. The method according to claim 1, wherein the compound of the formula (1) is a monosaccharide selected from the group consisting of D-glucose, D-galactose and D-mannose (in the formula (1), $R^1$ is —OH, $R^2$ is —OH, $R^3$ is —CH$_2$OH).

4. The method according to claim 1, wherein the compound of the formula (1) is an aldonic acid (in the formula (1), $R^1$ is —OH, $R^2$ is —OH, $R^3$ is —COOH).

5. The method according to claim 1, wherein the compound of the formula (1) is an amino sugar (in the formula (1), $R^1$ is —OH, $R^2$ is —NHCOCH$_3$, $R^3$ is —CH$_2$OH).

6. The method according to claim 3, wherein the produced saccharide polymer is a glycopolymer of the formula (2):

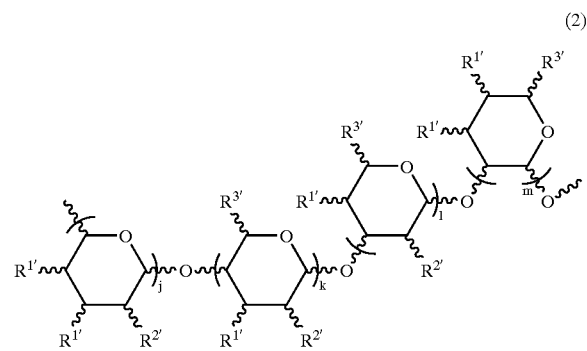

(2)

wherein $R^{1'}$ is —OH, $R^{2'}$ is —OH or —NHCOCH$_3$, and $R^{3'}$ is —CH$_2$OH, or one or more of $R^{1'}$, $R^{2'}$ and $R^{3'}$ is/are a residue of the saccharide of the formula (1), and j, k, l, and m means an absolute number of binding form of the saccharide molecules within the parentheses in the above formula, and j, k, l, m ≧ 0, provided that the total number of j, k, l, and m is in the range of 2 to 30, and the binding form in the parentheses in the above formula means that the binding form in the parenthesis "j" is (1→6)-α and -β bond, and the binding form in the parenthesis "k" is (1→4)-α and -β bond, the binding form in the parenthesis "l" is (1→3)-α and -β bond, and the binding form in the parenthesis "m" is (1→2)-α and -β bond.

7. The method according to claim 4, wherein the produced saccharide polymer is a compound of the formula (3):

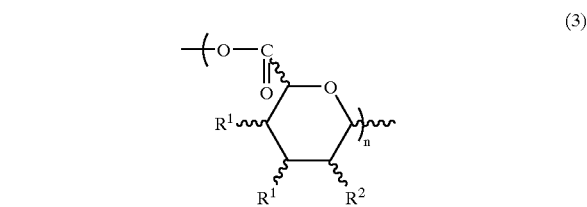

(3)

wherein $R^1$ is —OH, $R^2$ is —OH, n is an integer of 2 to 30.

8. A method for producing an amphiphilic compound of the formula (5):

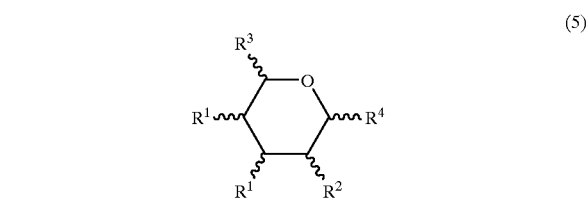

(5)

wherein $R^1$ is —OH, $R^2$ is —OH, $R^4$ is as defined below, and $R^3$ is —CH$_2$OH or —CH$_3$, which comprises reacting a monosaccharide of the formula (1):

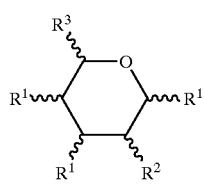
(1)

wherein $R^1$ is —OH, $R^2$ is —OH, $R^3$ is —CH$_2$OH or —CH$_3$ with a saturated or unsaturated alcohol of the formula (4):

$$R^4\text{—OH} \tag{4}$$

wherein $R^4$ is an alkyl chain of the formula: —(CH$_2$)$_p$—CH$_3$ ($0 \leqq p \leqq 23$) or a corresponding unsaturated group having 1 to 2 unsaturated bonds, in the presence of a solid superacid.

9. The method according to claim 5, wherein the produced saccharide polymer is a glycopolymer of the formula (2):

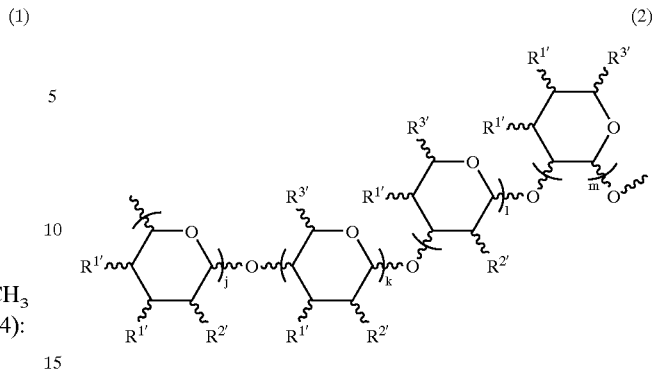
(2)

wherein $R^{1'}$ is —OH, $R^{2'}$ is —OH or —NHCOCH$_3$, and $R^{3'}$ is —CH$_2$OH, or one or more of $R^{1'}$, $R^{2'}$ and $R^{3'}$ is/are a residue of the saccharide of the formula (1), and j, k, l, and m means an absolute number of binding form of the saccharide molecules within the parentheses in the above formula, and j, k, l, m$\geqq$0, provided that the total number of j, k, l, and m is in the range of 2 to 30, and the binding form in the parentheses in the above formula means that the binding form in the parenthesis "j" is (1→6)-$\alpha$ and -$\beta$ bond, and the binding form in the parenthesis "k" is (1→4)-$\alpha$ and -$\beta$ bond, the binding form in the parenthesis "l" is (1→3)-$\alpha$ and -$\beta$ bond, and the binding form in the parenthesis "m" is (1→2)-$\alpha$ and -$\beta$ bond.

* * * * *